United States Patent
McCornack et al.

(10) Patent No.: US 11,959,270 B1
(45) Date of Patent: Apr. 16, 2024

(54) STUD RAIL SYSTEMS AND METHODS FOR USE IN REINFORCED CONCRETE STRUCTURES

(71) Applicant: Morse Distribution, Inc., Bellingham, WA (US)

(72) Inventors: Scott McCornack, Ferndale, WA (US); Joshua Hupp, Sedro-Woolley, WA (US)

(73) Assignee: Morse Distribution, Inc., Bellingham, WA (US)

( * ) Notice: Subject to any disclaimer, the term of this patent is extended or adjusted under 35 U.S.C. 154(b) by 123 days.

(21) Appl. No.: 17/650,139

(22) Filed: Feb. 7, 2022

Related U.S. Application Data

(60) Provisional application No. 63/175,964, filed on Apr. 16, 2021.

(51) Int. Cl.
| | |
|---|---|
| *E04B 1/41* | (2006.01) |
| *E04B 1/16* | (2006.01) |
| *E04B 1/21* | (2006.01) |
| E04C 2/42 | (2006.01) |
| F16C 11/04 | (2006.01) |

(52) U.S. Cl.
CPC ............... *E04B 1/41* (2013.01); *E04B 1/165* (2013.01); *E04B 1/21* (2013.01); *E04C 2/42* (2013.01); *F16C 11/04* (2013.01)

(58) Field of Classification Search
CPC ............... E04B 1/165; E04B 1/21; E04B 1/41
USPC ........................................................ 52/253
See application file for complete search history.

(56) References Cited

U.S. PATENT DOCUMENTS

| | | | | |
|---|---|---|---|---|
| 11,383 A | * | 7/1854 | Mott | E04B 1/41 52/698 |
| 776,419 A | * | 11/1904 | Platt | E04D 11/005 52/603 |
| 826,909 A | * | 7/1906 | Thompson | E04B 1/41 182/87 |

(Continued)

FOREIGN PATENT DOCUMENTS

| | | |
|---|---|---|
| CH | 696204 | 2/2007 |
| DE | 19813565 A1 | 9/1999 |

(Continued)

OTHER PUBLICATIONS

Dayton Superior, "Building Strength" Brochure, 2016, 6 pages.

(Continued)

*Primary Examiner* — James M Ference
*Assistant Examiner* — Joseph J. Sadlon
(74) *Attorney, Agent, or Firm* — Michael R. Schacht; Schacht Law Office, Inc.

(57) ABSTRACT

A stud rail system for a reinforced concrete structure defining a column portion and a slab portion comprises at least one stud rail assembly. The at least one stud rail assembly comprises a plurality of rail portions, a plurality of cross portions, a plurality of pin projections, and a plurality of support assemblies. Each rail portion supports at least one of the plurality of pin projections. Each of the support assemblies engages one of the plurality of rail portions such that the plurality of rail portions are rotatably connected to the plurality of cross portions to allow the stud rail assembly to be reconfigured between a collapsed configuration and an expanded configuration.

20 Claims, 13 Drawing Sheets

(56) References Cited

U.S. PATENT DOCUMENTS

| | | | | |
|---|---|---|---|---|
| 841,463 A * | 1/1907 | Smith | | E04C 5/065 52/649.2 |
| 865,336 A * | 9/1907 | Gardner | | E04B 1/20 52/274 |
| 966,274 A * | 8/1910 | Wainwright | | E04F 13/06 249/48 |
| 1,119,406 A * | 12/1914 | Danielson | | E04B 5/43 52/260 |
| 1,804,342 A * | 5/1931 | Hyde | | E04B 5/43 52/253 |
| 1,948,691 A * | 2/1934 | Bauer | | H01H 9/44 52/649.6 |
| 2,205,545 A * | 6/1940 | Schmitt | | E04B 1/4121 52/27 |
| 2,314,456 A * | 3/1943 | Nadell | | E04B 1/161 52/669 |
| 2,780,935 A * | 2/1957 | Rumble | | E04G 13/00 52/741.15 |
| 3,354,593 A * | 11/1967 | Zukas | | E04B 1/215 52/236.7 |
| 3,861,104 A * | 1/1975 | Bower | | E04B 1/41 52/289 |
| 3,903,667 A * | 9/1975 | Zetlin | | E04B 5/43 52/283 |
| 3,912,218 A * | 10/1975 | Lister | | B28B 7/0044 249/207 |
| 3,960,356 A * | 6/1976 | Adams | | B28B 23/0056 249/205 |
| 4,081,935 A * | 4/1978 | Wise | | E04B 5/43 52/432 |
| 4,275,538 A * | 6/1981 | Bounds | | E02D 27/32 52/294 |
| 4,438,607 A * | 3/1984 | Nelson | | E02D 27/00 52/274 |
| 4,443,985 A * | 4/1984 | Moreno | | E04B 5/43 52/236.8 |
| 4,736,554 A * | 4/1988 | Tyler | | E04B 1/0007 52/700 |
| 4,942,714 A | 7/1990 | Langley, Jr. et al. | | |
| 5,050,364 A * | 9/1991 | Johnson | | E04B 1/4157 D8/387 |
| 5,060,436 A * | 10/1991 | Delgado, Jr. | | B28B 23/005 52/699 |
| 5,181,359 A * | 1/1993 | Chana | | E04B 5/43 52/250 |
| 5,419,055 A * | 5/1995 | Meadows | | E04G 21/1808 33/518 |
| 5,505,033 A * | 4/1996 | Matsuo | | E02D 27/42 52/169.9 |
| 5,867,960 A * | 2/1999 | Andra | | E04C 5/03 52/855 |
| 6,052,962 A * | 4/2000 | Ghali | | E04B 5/43 52/600 |
| 6,161,352 A | 12/2000 | Frohlich | | |
| 6,327,832 B1 * | 12/2001 | Ernst | | E04B 5/43 52/719 |
| 6,347,489 B1 * | 2/2002 | Marshall, Jr. | | E02D 27/00 52/126.6 |
| 6,502,362 B1 * | 1/2003 | Zambelli | | E04G 21/1808 33/518 |
| 7,766,299 B2 * | 8/2010 | Titus, II | | G09F 15/0025 52/157 |
| 7,789,099 B2 * | 9/2010 | Mallookis | | E04H 15/50 403/174 |
| 8,234,832 B2 | 8/2012 | Birnbaum et al. | | |
| 8,375,678 B1 * | 2/2013 | Ferrer | | E04C 5/0604 52/649.3 |
| 8,522,504 B2 * | 9/2013 | Ghali | | E04C 5/0645 52/685 |
| 8,549,805 B2 * | 10/2013 | Kim | | E04G 13/021 52/220.1 |
| 8,955,283 B2 * | 2/2015 | Takagi | | E04F 11/1812 |
| 9,109,874 B2 * | 8/2015 | Simmons | | E04G 13/021 |
| 9,175,705 B1 * | 11/2015 | Clark, Jr. | | E04B 1/161 52/220.1 |
| 9,683,367 B1 * | 6/2017 | Ting | | E04B 5/43 52/600 |
| 9,803,354 B1 | 10/2017 | Francies, III | | |
| 9,834,922 B2 * | 12/2017 | Boyd | | E04B 5/43 |
| 9,840,838 B2 | 12/2017 | Heudorfer et al. | | |
| 10,100,511 B2 * | 10/2018 | Boyd | | E04B 1/483 |
| 10,260,224 B1 | 4/2019 | Jazzar | | E04G 11/38 |
| 10,301,838 B1 * | 5/2019 | Karakas | | E04C 5/0609 |
| 10,309,103 B2 * | 6/2019 | Recker | | E01C 5/001 |
| 10,323,402 B1 | 6/2019 | Yin | | E04C 5/01 |
| 10,501,949 B2 * | 12/2019 | Weaver | | E04G 13/021 |
| 10,865,559 B2 * | 12/2020 | Newbrough | | E04B 2/92 |
| 11,199,019 B1 * | 12/2021 | Ramadan | | E04F 11/1812 |
| 11,434,654 B2 * | 9/2022 | Ramadan | | E04F 11/1812 |
| 2007/0283645 A1 * | 12/2007 | Ryan | | E02D 27/42 52/294 |
| 2009/0151282 A1 * | 6/2009 | Loayza | | E04B 7/045 52/285.3 |
| 2012/0047816 A1 * | 3/2012 | Zhong | | E04B 1/161 52/220.1 |
| 2016/0010331 A1 * | 1/2016 | Milanowski | | E04C 2/42 52/581 |
| 2017/0130465 A1 * | 5/2017 | Claudin | | E04B 5/43 52/283 |
| 2018/0223532 A1 * | 8/2018 | Bennett | | E04B 5/43 |
| 2023/0040469 A1 * | 2/2023 | Mathe | | E04B 1/48 |

FOREIGN PATENT DOCUMENTS

| | | |
|---|---|---|
| DE | 202014004338 U1 | 8/2015 |
| EP | 0947641 B1 | 10/2003 |
| EP | 1659231 A1 | 5/2006 |
| WO | 9905374 A1 | 2/1999 |
| WO | 2012160252 A1 | 11/2012 |

OTHER PUBLICATIONS

Jordahl, "Accessories Reinforcement Technology", https://www.jordahl-group.com/en/371/products/reinforcement-technology/accessories/, accessed Jan. 3, 2019, 2 pages.

Peikko Group, "PSB Punching Reinforcement", Technical Manual, Jun. 2013, 20 pages.

* cited by examiner

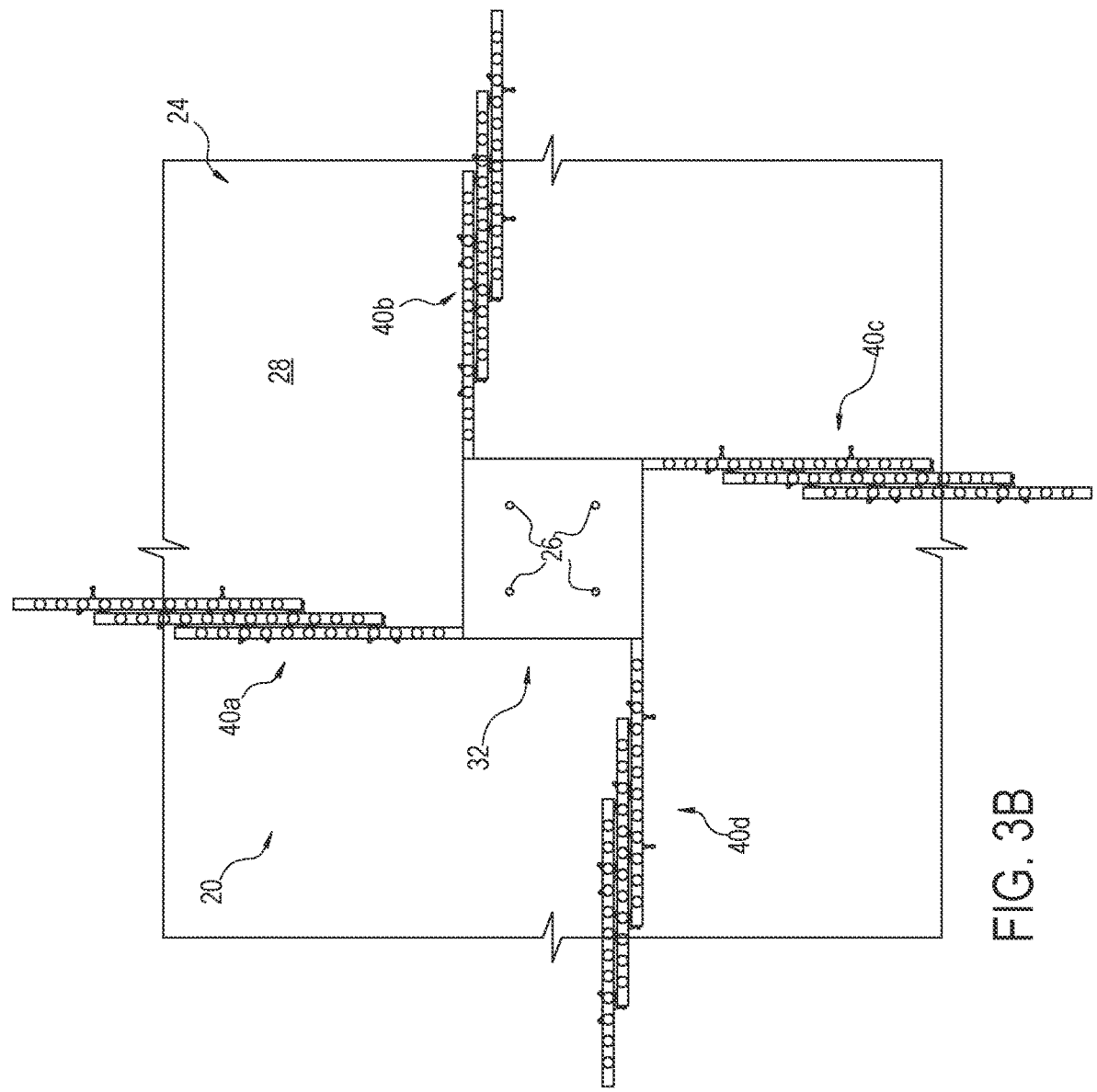

STUD RAIL SYSTEMS AND METHODS FOR USE IN REINFORCED CONCRETE STRUCTURES

RELATED APPLICATIONS

This application, U.S. patent application Ser. No. 17/650,139 filed Feb. 7, 2022, claims benefit of U.S. Provisional Application Ser. No. 63/175,964 filed Apr. 16, 2021, the contents of which are incorporated herein by reference.

TECHNICAL FIELD

The present invention relates to stud rail systems and methods for concrete structures and, more specifically, to stud rail systems and methods for reinforcing concrete structures at a column.

BACKGROUND

Metal such as steel is conventionally embedded in wet concrete to reinforce the concrete after the concrete has cured to strengthen the resulting reinforced concrete structure. Metal reinforcement structures can be in a variety of sizes and configurations, such as bars (rebar), cages, cables, and like, that are engineered to yield a reinforced concrete structure meeting predetermined structural requirements.

A stud rail system particular form of metal structure used to reinforce the juncture of horizontal concrete structures, such as beams and/or decks, to vertical concrete structures, such as columns and/or piles. Stud rails conventionally comprise flat bar stock to which pins are welded.

Stud rails are typically engineered for use at a specific location within a larger reinforced concrete structure, and the larger structure may comprise multiple configurations of stud rails depending on the structural requirements of each specific location within the larger structure. Improperly assembling and/or securing one or more stud rails can compromise the structural integrity of the entire reinforced concrete structure. Further, conventional methods of properly fabricating, assembling, and securing stud rails can be time consuming and thus costly.

The need thus exists for improved stud rail systems and methods that are easier to assemble and minimize the likelihood of improper assembly and/or securing of the stud rail(s) during the process of forming at least a portion of a reinforced concrete structure.

SUMMARY

The present invention may be embodied as a stud rail system for a reinforced concrete structure defining a column portion and a slab portion comprises at least one stud rail assembly. The at least one stud rail assembly comprises a plurality of rail portions, a plurality of cross portions, a plurality of pin projections, and a plurality of support assemblies. Each rail portion supports at least one of the plurality of pin projections. Each of the support assemblies engages one of the plurality of rail portions such that the plurality of rail portions are rotatably connected to the plurality of cross portions to allow the stud rail assembly to be reconfigured between a collapsed configuration and an expanded configuration.

The present invention may also be embodied as a method of reinforcing a concrete structure comprising a column portion and a slab portion comprising the following steps. A form, a plurality of rail portions, a plurality of cross portions, and a plurality of support assemblies are provided. A plurality of pin projections are supported on each of the plurality of rail portions. At least one stud rail assembly is formed by engaging each of the support assemblies with one of the plurality of rail portions such that the plurality of rail portions are rotatably connected to the plurality of cross portions to allow the stud rail assembly to be reconfigured between a collapsed configuration and an expanded configuration. A stud rail system is formed by arranging the at least one stud rail assembly in the expanded configuration on the form in a desired location and orientation relative to the column portion. Concrete is arranged on the form around the stud rail system to form the slab portion.

The present invention may also be embodied as a reinforced concrete structure comprising a column portion, a slab portion, and a stud system comprising a plurality of stud rail assemblies. Each of the plurality of stud rail assemblies comprises a plurality of rail portions, a plurality of cross portions, a plurality of pin projections each supported by one of the plurality of rail portions, and a plurality of support assemblies. Each of the support assemblies engages one of the plurality of rail portions such that the plurality of rail portions are rotatably connected to the plurality of cross portions to allow the stud rail assembly to be reconfigured between a collapsed configuration and an expanded configuration. The stud rail system is within the slab portion in a desired location and orientation relative to the column portion.

BRIEF DESCRIPTION OF THE DRAWINGS

FIG. 3B is a top plan view of the first step in the process of arranging the first example stud rail system relative to the example first stage structure;

DETAILED DESCRIPTION

Figure 1:
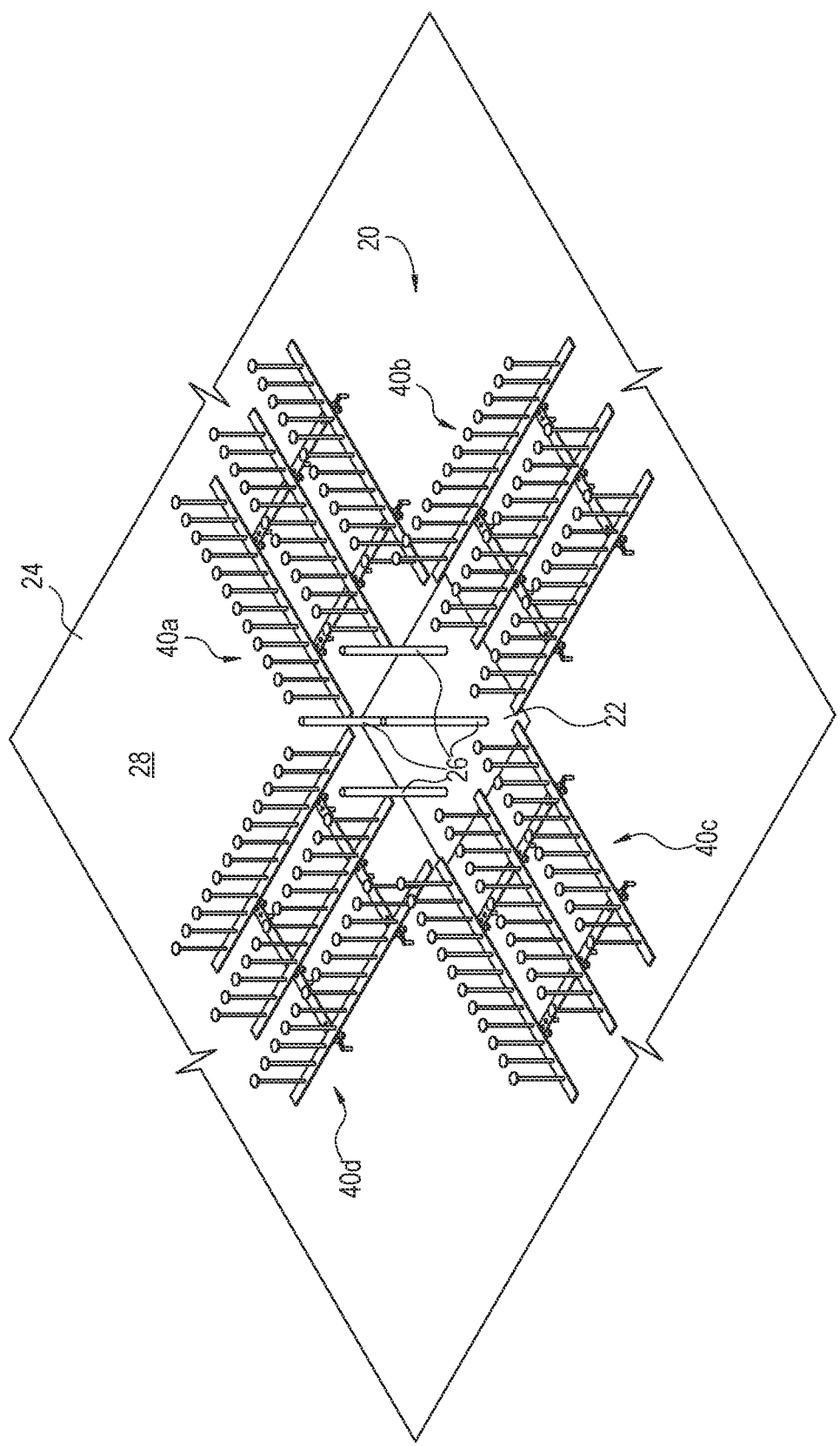
FIG. 1 is a perspective view of a first example stud rail system of the present invention secured in a desired orientation and at a desired location relative to an example first stage structure comprising an example first column portion and an example form.
Figure 6A:
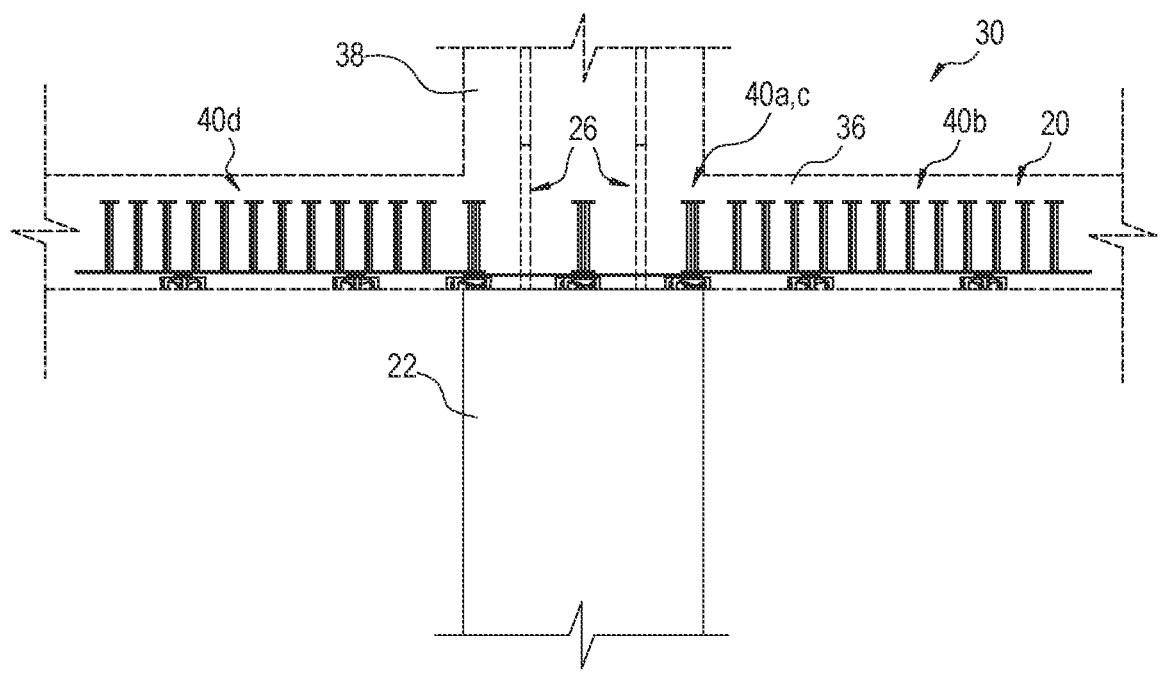
FIG. 6A is a side elevation view of forming an example third stage structure comprising a second column portion on the example second stage structure.
Figure 6B:
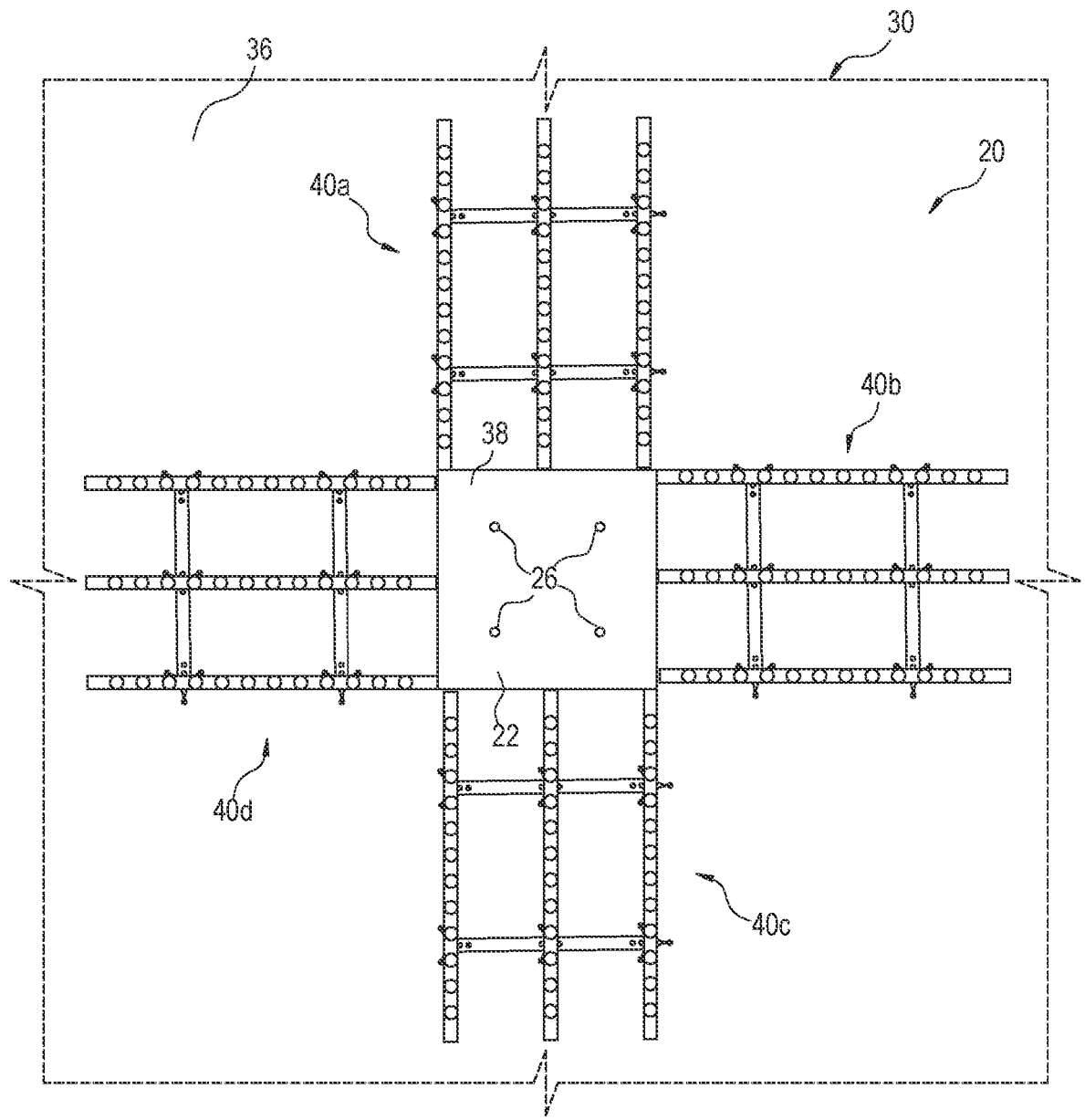
FIG. 6B is a top plan view of forming the example third stage structure comprising a second column portion on the example second stage structure.

FIG. 1 is a perspective view of a first example stud rail system 20 constructed in accordance with, and embodying, the principles of the present invention. In FIG. 1, the first example stud rail system 20 secured relative to an example first column portion 22 and an example form 24. As is conventional, the example first column portion 22 comprises a column rebar structure 26, and the example form 24 defines a form upper surface 28. The first example stud rail system 20 and the first column portion 22 form at least a portion of a completed reinforced concrete structure 30 as depicted in FIGS. 6A and 6B.

Figure 2A:
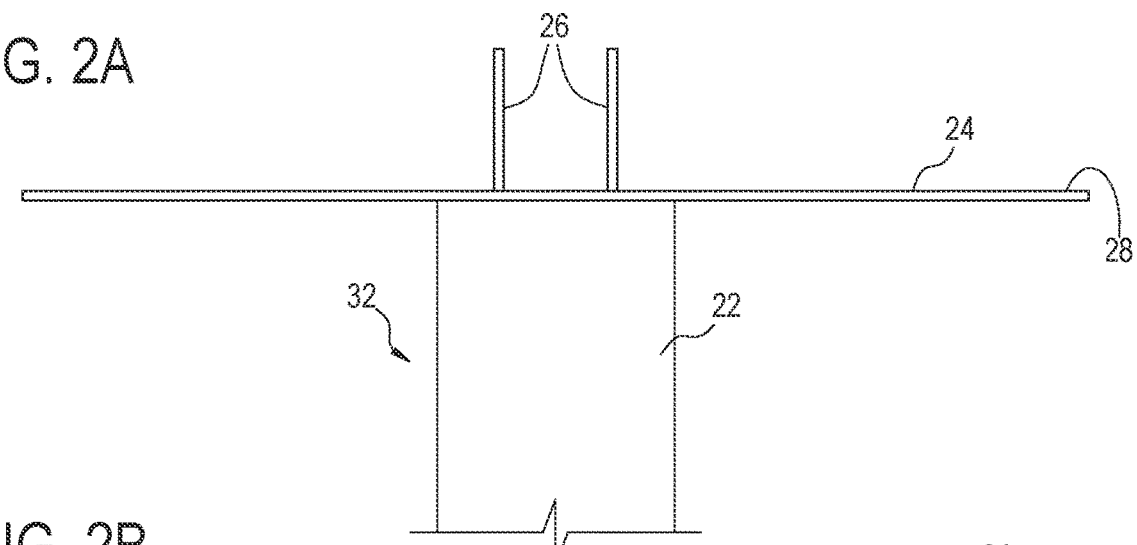
FIG. 2A is a side elevation view of the example first stage structure prior to placement of the first example stud rail system.
Figure 2B:
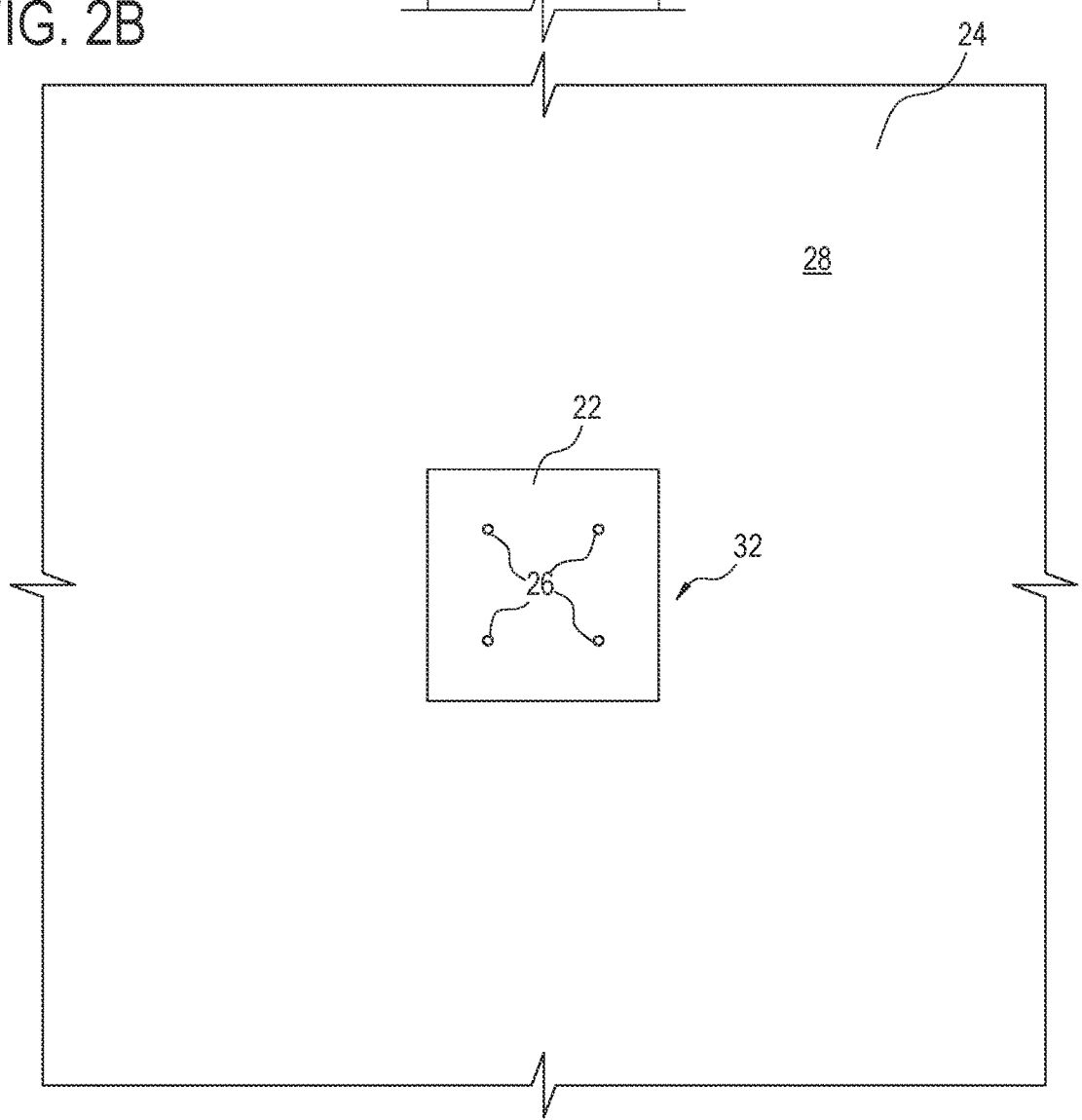
FIG. 2B is a top plan view of the example first stage structure prior to placement of the first example stud rail system.

FIGS. 1, 2A, and 2B illustrate that the example first column portion 22 forms an example first stage structure 32, and the example form 26 is supported such that the form upper surface 28 is in a desired location and orientation relative to the example first stage structure 32 in a conventional manner. Further, the example column rebar structure 26 extends from the first column portion 22 beyond (e.g., above) the form upper surface 28 of the example form 24. FIGS. 2A and 2B illustrate a first step in the process of forming the completed reinforced concrete structure 30.

Figure 4A:
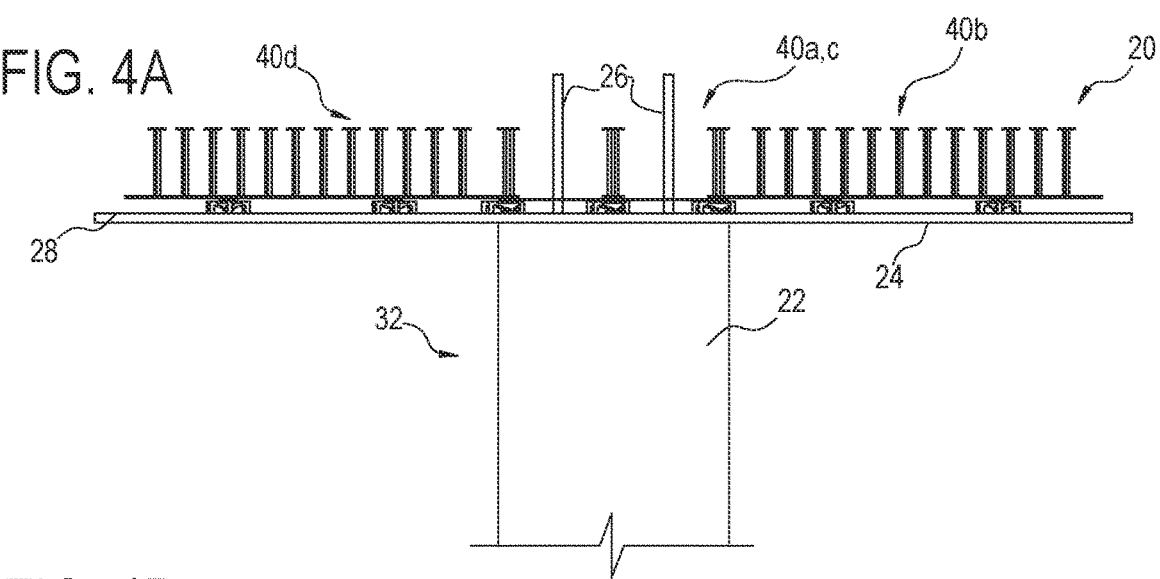
FIG. 4A is a side elevation view of a second step in the process of arranging the first example stud rail system relative to the example first stage structure.
Figure 4B:
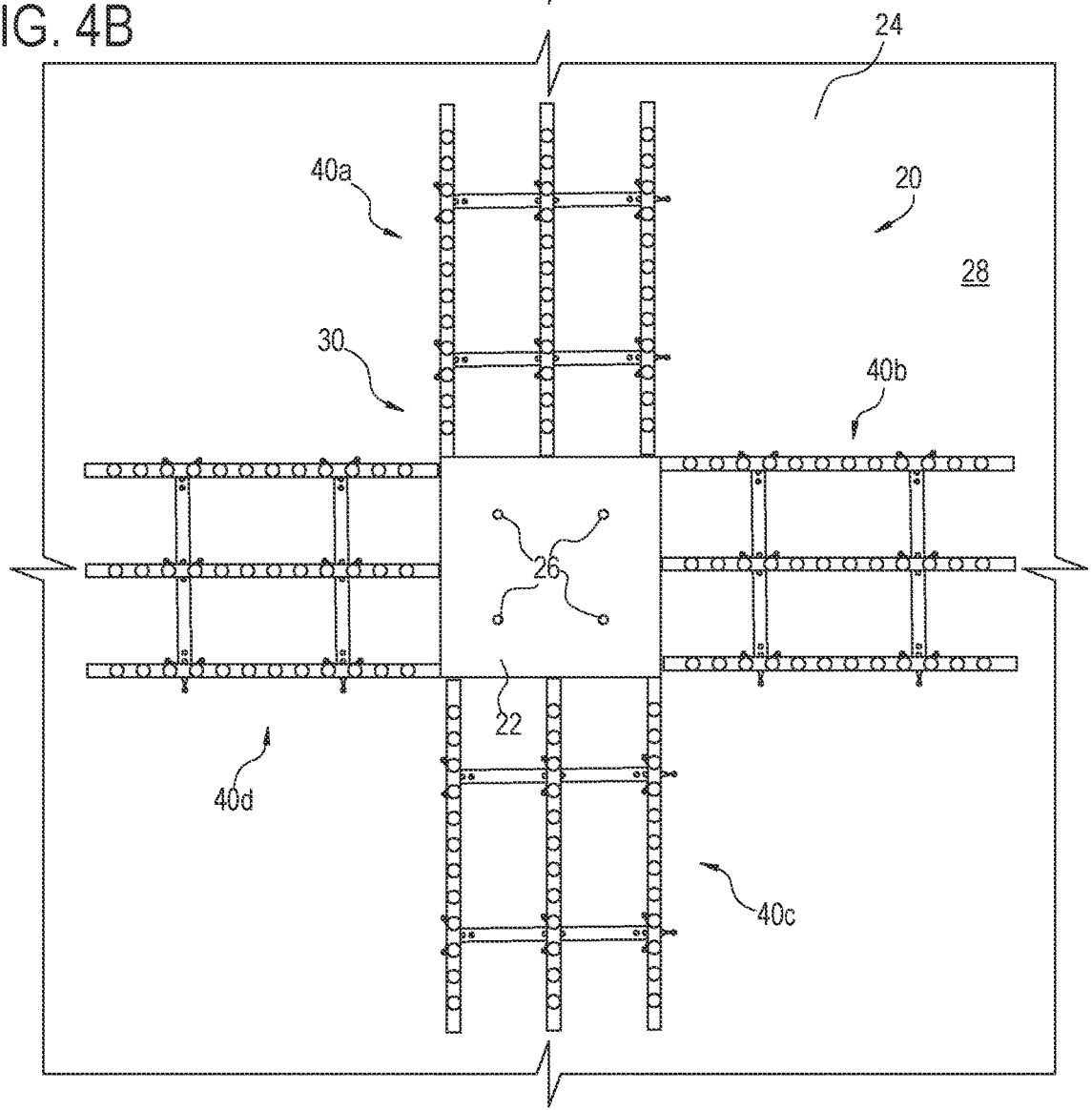
FIG. 4B is a top plan view of the second step in the process of arranging the first example stud rail system relative to the example first stage structure.
Figure 5A:
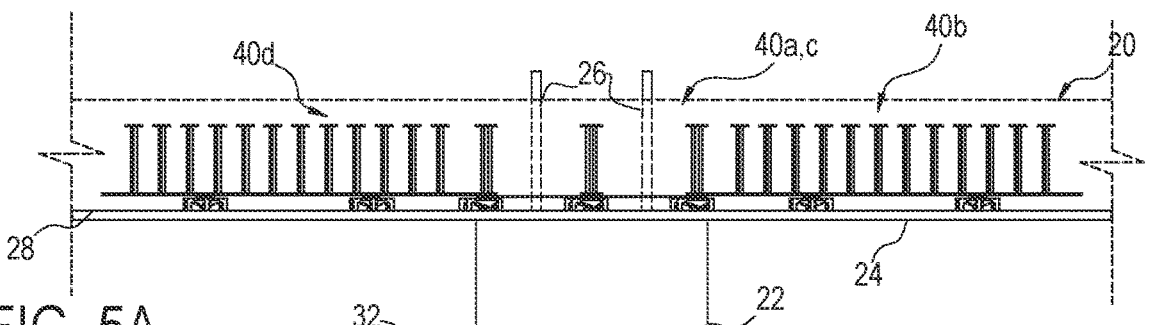
FIG. 5A is a side elevation view of a process of pouring concrete on the example first stage structure and around the first example stud rail system to form an example second stage structure.
Figure 5B:
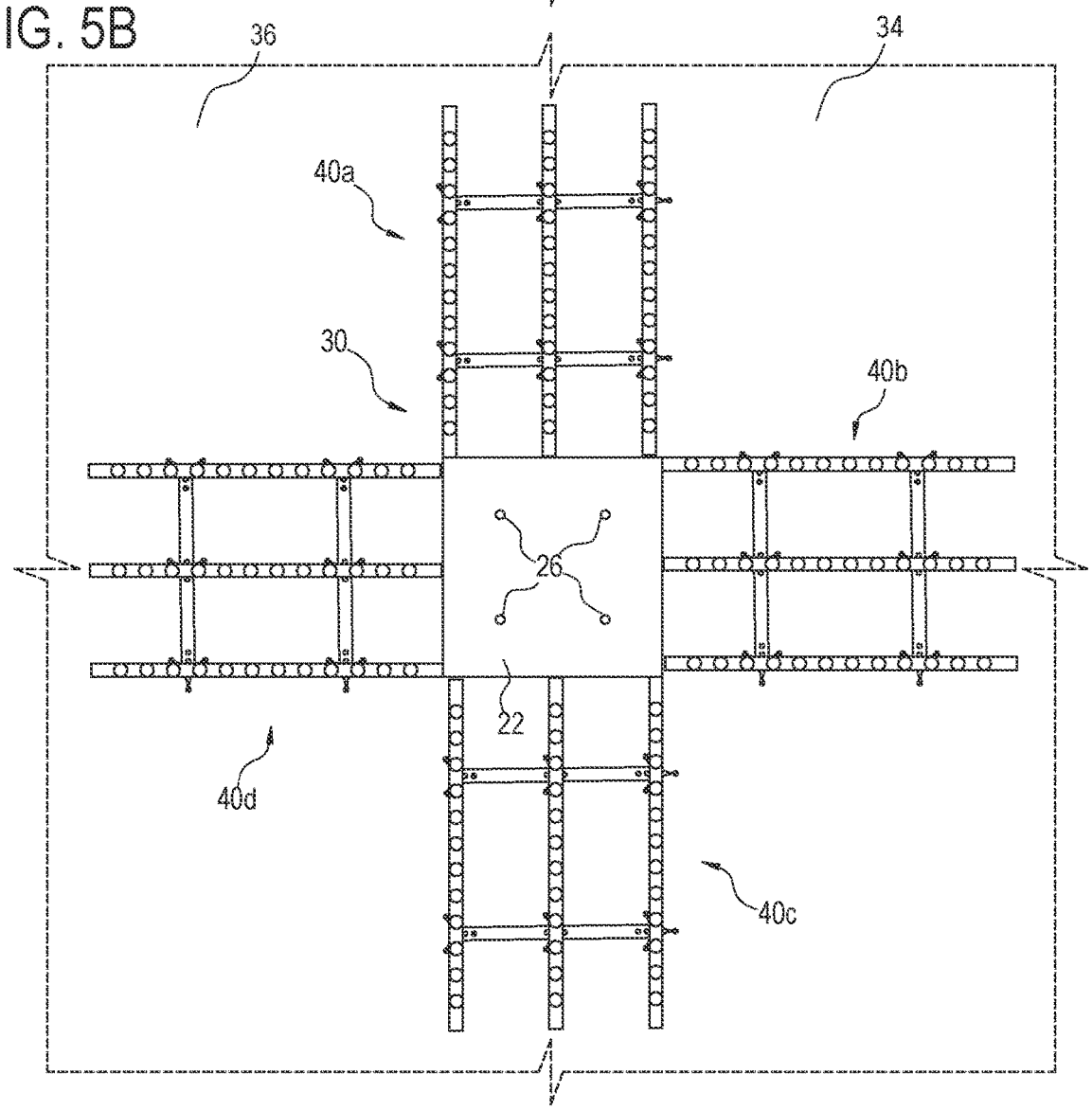
FIG. 5B is a top plan view of the process of pouring concrete on the example first stage structure and around the first example stud rail system to form an example second stage structure.

With the example form 24 supported in the desired location and the desired orientation relative to the example first stage structure 32, the first example stud rail system 20 is arranged at least partly above one or both of the example form 24 and the example first stage structure 32. In particular, the first example stud rail system is reconfigured from a collapsed configuration (FIGS. 3A and 3B) to an expanded configuration (FIGS. 4A and 4B) in a desired location and in a desired orientation relative to the example form 24 and the example first stage structure 32. A second stage structure 34 is then formed by pouring a slab 36 on top of the example form 24 and the example first stage structure 32 as shown in FIGS. 5A and 5B. After the slab 36 is cured to form the example second stage structure 34, an example second column portion 38 is poured to form the completed reinforced concrete structure 30 as shown in FIGS. 6A and 6B.

With the foregoing general description of the construction and operation of the present invention in mind, the details of the first example stud rail system 20 will now be described in further detail. In the following discussion, reference characters without appended letters generally refer to components identified by such reference characters, while reference characters with appended letters refer to a specific components of the type identified by reference characters without appended letters. The use of reference characters with and without appended letters thus does not indicate different components.

The first example stud rail system 20 depicted and described herein is an example that has been engineered to reinforce the completed concrete structure 30. However, a stud rail system of the present invention may take forms other than the first example stud rail system. For example, another embodiment of a stud rail system of the present invention designed for use in a different reinforced concrete structure may be embodied in sizes and configurations other than those of the first example stud rail system 20.

In particular, the first example stud rail system 20 comprises first, second, third, and fourth stud rail assemblies 40a, 40b, 40c, and 40d. The example stud rail assemblies 40a, 40b, 40c, and 40d are the same. However, the stud rail assemblies 40a, 40b, 40c, and 40d forming a stud rail system 20 of the present invention need not be the same, and stud rail assemblies of the present invention may be embodied in sizes and configurations other than those of the example stud rail assemblies 40a, 40b, 40c, and 40d. In the following discussion, the reference character 40 will be used to refer to any one of the example stud rail assemblies 40a, 40b, 40c, and 40d.

Figure 7:
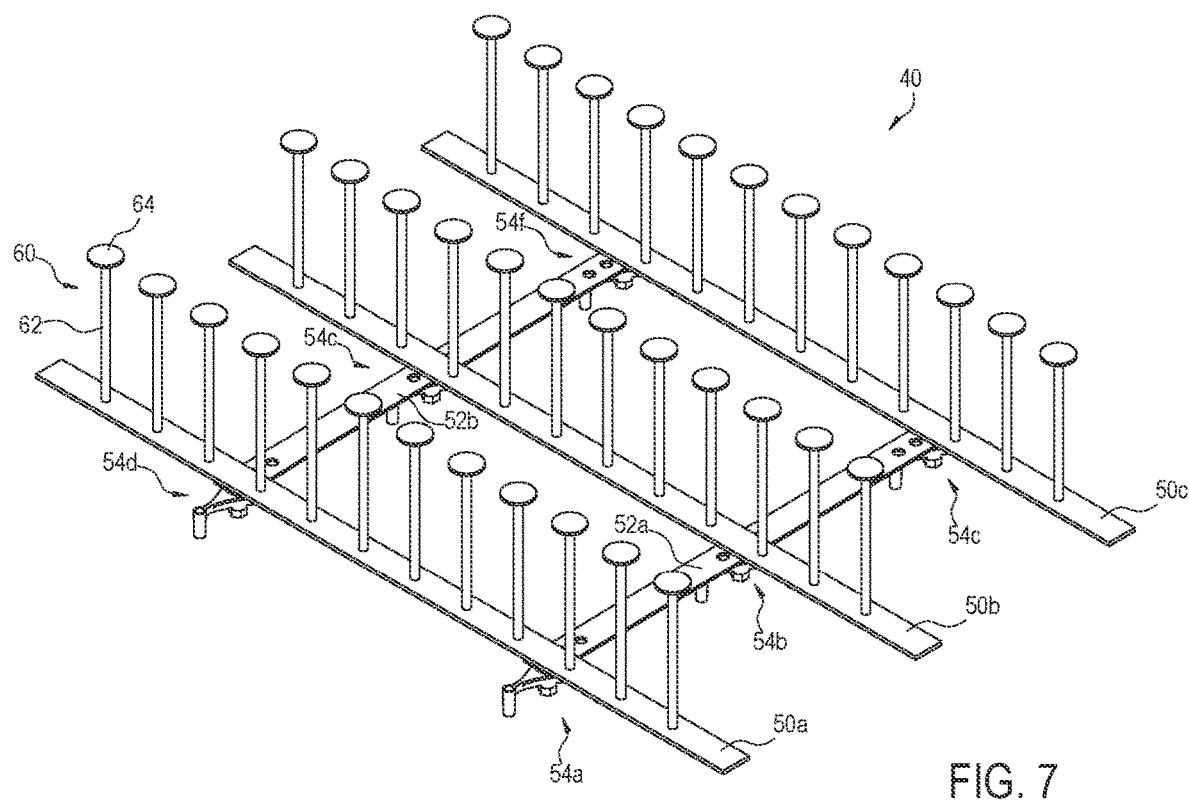
FIG. 7 is a perspective view of an example first stud rail assembly forming part of the first stud rail system, the example first stud rail assembly being depicted in an expanded configuration.
Figure 8:
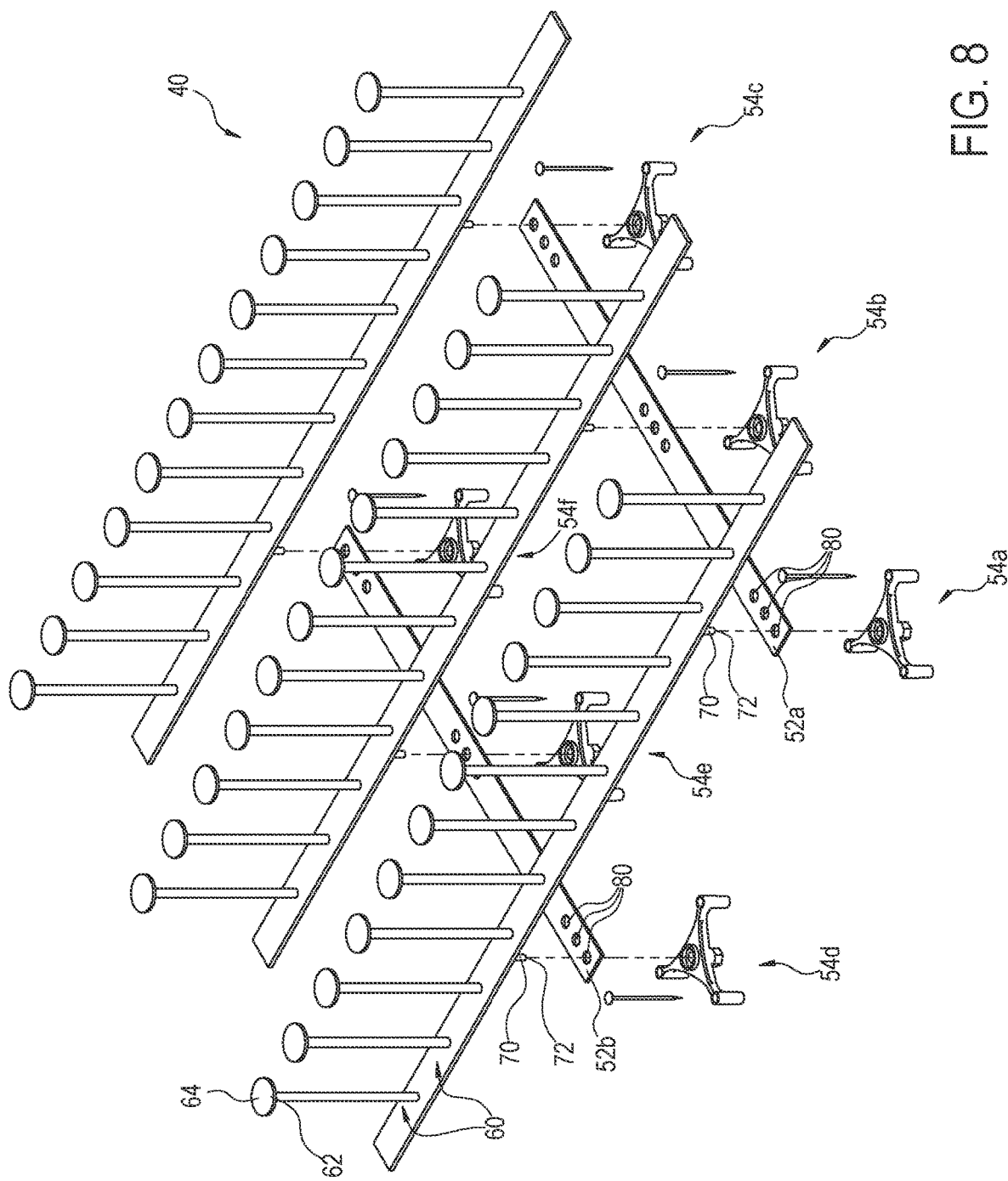
FIG. 8 is a top perspective exploded view of the example first stud rail assembly.

As perhaps best shown in FIG. 7, each stud rail assembly 40 comprises a plurality of rail portions 50, a plurality of cross portions 52, and a plurality of support assemblies 54. In particular, the example stud rail assembly 40 comprises first, second, and third rail portions 50a, 50b, and 50c, first and second cross portions 52a and 52b, and first, second, third, fourth, fifth, and sixth support assemblies 54a, 54b, 54c, 54d, 54e, and 54f. Stud rail assemblies with different numbers of rail portions and cross portions may be used depending on the structural requirements of the completed reinforced concrete structure 30.

Each of the plurality rail portion(s) 50 defines at least one pin projection 60 comprising a rod portion 62 and a cap portion 64 and at least one support projection 70 configured to engage one or more of the support assemblies 54 The example rod portion(s) 62 is(are) cylinders having a first diameter, and the example cap portion(s) 64 is(are) discs defining a second diameter that is greater than the first diameter. The example pin projections 60 are all the same and, as depicted, may be conventional but may take different sizes, shapes, and configurations as required by the structural requirements of the completed reinforced concrete structure 30.

The example support projection 70 may take any form appropriate to allow at least one of the plurality support assemblies 54 to be permanently or detachably attached to the plurality rail portion(s) 50, and thus to the stud rail assembly 40, as will be described in further detail below. The example support projection 70 defines a threaded external surface 72 adapted to detachably attach one of the plurality of support assemblies 54 to the stud rail assembly 40 as will be described in further detail below.

Each of the plurality of cross portion(s) 52 defines at least one support opening 80 for each of the plurality of rail portion(s) 50. To form the example stud rail assembly 40, each of the example support projection(s) 70 is passed in a first direction through one of the support openings 80, and one of the plurality of support assemblies 54 is secured to each of the support projection(s) 70. The plurality of support assemblies 54 inhibit or prevent movement of the support projection(s) 70 in a second direction opposite the first direction. However, the support projection(s) 70 each form an axle 74 that allows pivoting movement of the rail portion(s) 50 relative to the cross portion(s) 52.

Figure 3A:
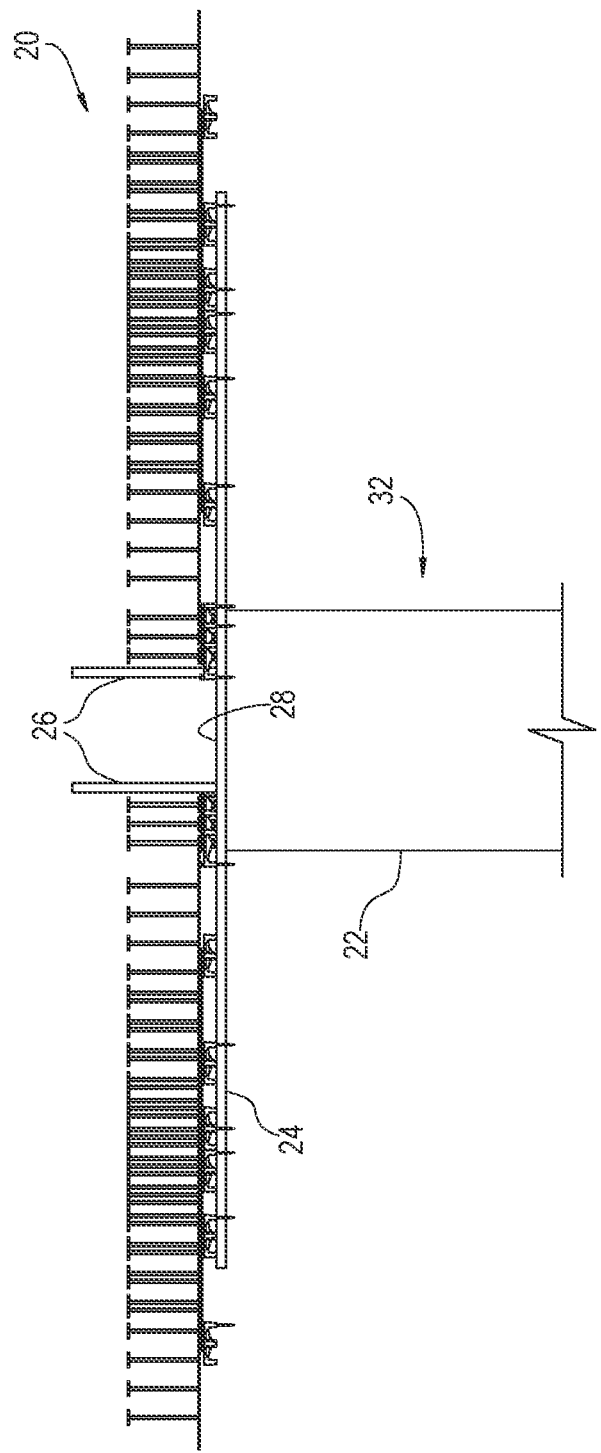
FIG. 3A is a side elevation view of a first step in the process of arranging the first example stud rail system relative to the example first stage structure.

The engagement of at least one of the plurality of support assembly(ies) 54 with the support projection(s) 70 thus secures the plurality of cross portion(s) 52 to the plurality of rail portion(s) 50 to form the example stud rail assembly 40. With proper arrangement of the support projection(s) 70 and the support opening(s) 80, the pivoting movement allowed between the plurality of rail portion(s) 50 and plurality of the cross portion(s) 52 allows the example stud rail assembly 40 to be reconfigured between a collapsed or folded configuration as depicted in FIGS. 3A, 3B, and 11 and an expanded or open configuration as depicted in FIGS. 4A, 4B, 7, and 10.

Figure 10:
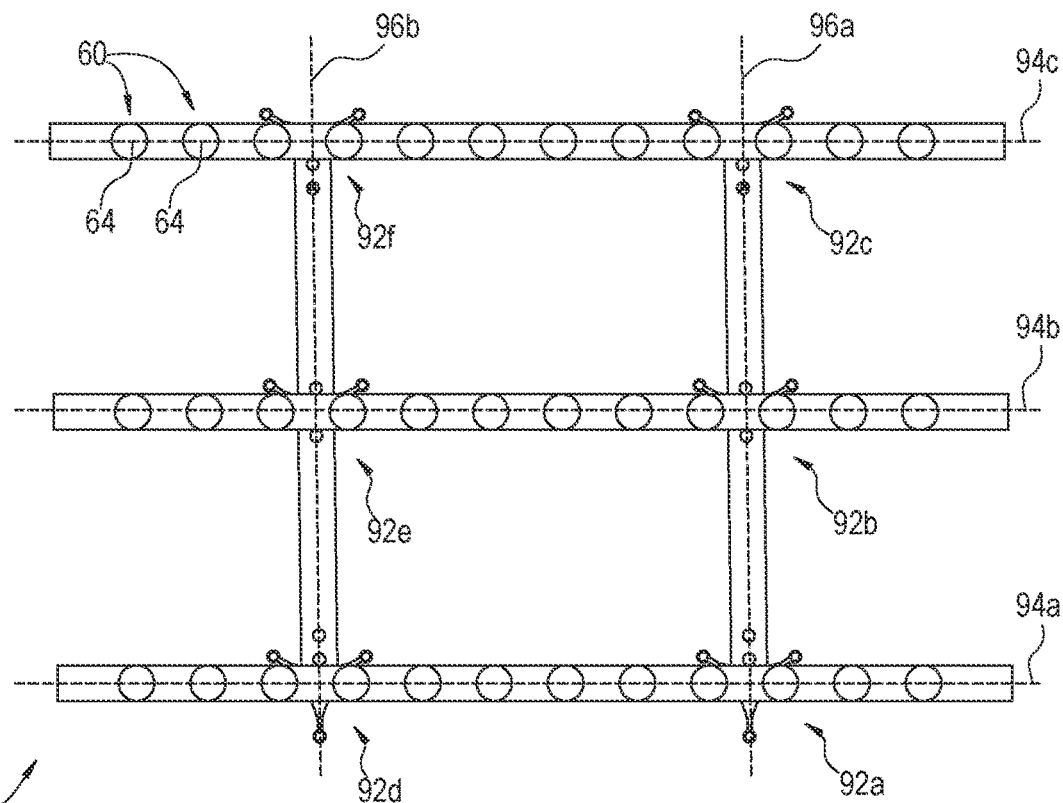
FIG. 10 is a top plan view of the example first stud rail assembly, the example first stud rail assembly being depicted in an expanded configuration.
Figure 11:
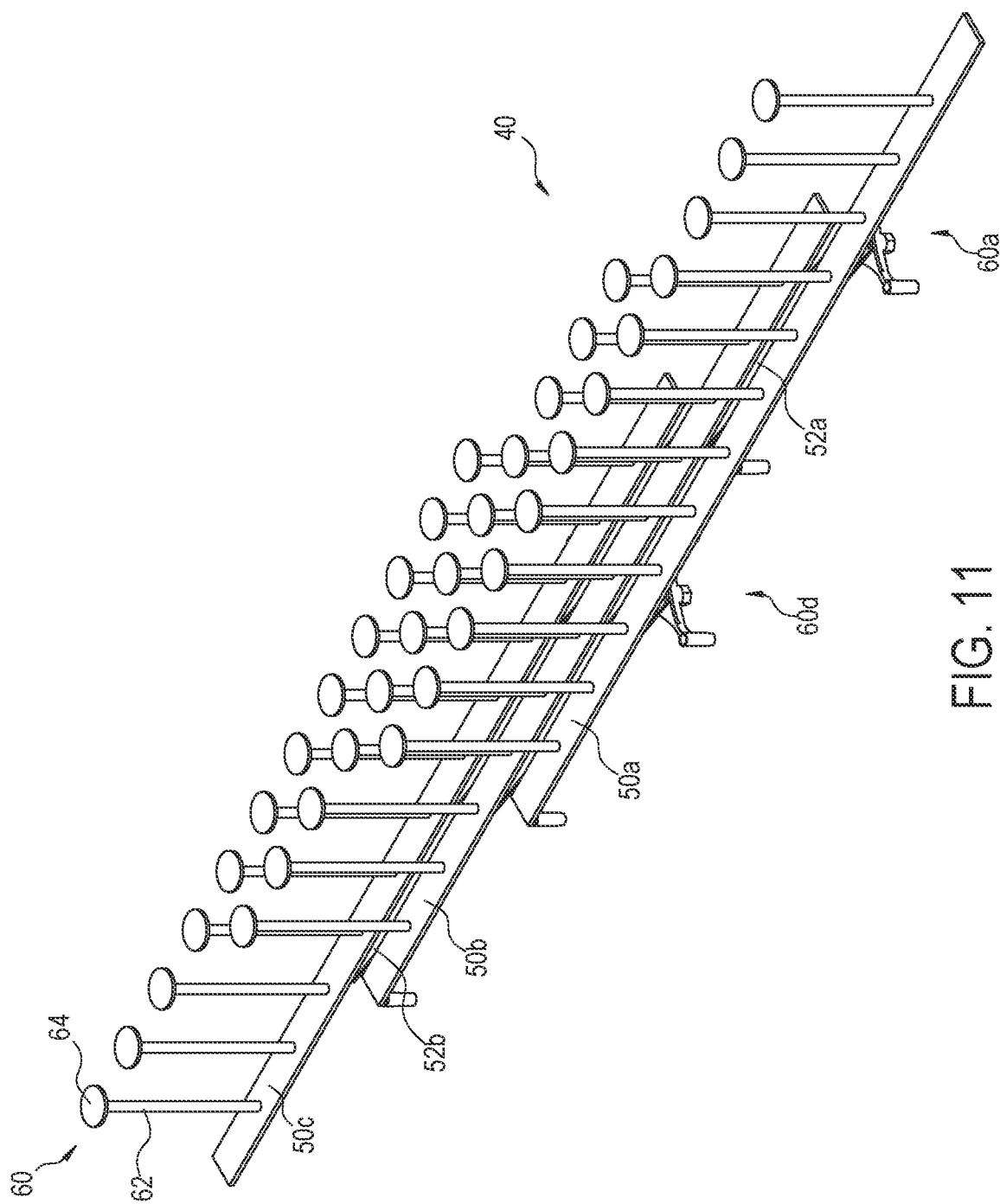
FIG. 11 is a perspective view of an example first stud rail assembly forming part of the first stud rail system, the example first stud rail assembly being depicted in a collapsed configuration.

In particular, with the example stud rail assembly 40 in the expanded or open configuration as shown in FIG. 10, the example support projection(s) 70 and the example support openings 80 are configured and located in a symmetrical grid 90 comprising the intersections 92 of a plurality of longitudinal axes 94 and a plurality lateral axes 96. The example stud rail assembly 40 defines first, second, and third longitudinal axes 94a, 94b, and 94c, first and second lateral axes 96a and 96b, and first, second, third, fourth, fifth, and sixth intersections 92a, 92b, 92c, 92d, 92f, and 92e. In the example stud rail assembly 40, each of the example intersections 92a, 92b, 92c, 92d, 92f, and 92e correspond to one of the example support assemblies 54a, 54b, 54c, 54d, 54e, and 54f. Grids with different numbers of longitudinal axes, lateral axes, and intersection points may be used depending on the structural requirements of the completed reinforced concrete structure 30.

The folded configuration allows the example stud rail assembly 40 to be stored and shipped in a smaller form factor. The expanded configuration allows the example stud rail assembly 40 to be used, by itself or with one or more other stud rail assemblies, such as the example stud rail assemblies 40b, 40c, and 40d, to form a stud rail system, such as the example stud rail system 20.

The example plurality of support assembly(ies) 54 will now be described in further detail. In addition to engaging the support projections 70 to join the rail portion(s) 50 to the cross portion(s) 52, the example plurality of support assembly(ies) 54 are, as shown in FIGS. 3A, 4A, 5A, and 6A, also configured to space the stud rail assemblies 40a, 40b, 40c, and 40d a predetermined distance D from the surface 28 of the form 24. The example support assembly(ies) 54 are further configured to allow the stud rail assemblies 40a, 40b, 40c, and 40d to be secured in a predetermined configuration relative to the first column portion 22 and to the form 24.

The plurality of rail portion(s) 50 and the plurality of cross portion(s) 52 are typically made of a material capable of reinforcing the completed reinforced concrete structure 30 as determined by the structural requirements of the completed reinforced concrete structure 30. The example plurality of rail portion(s) 50 and plurality of cross portion(s) 52 are thus preferably made of a structural material such as steel, but other materials, coated or uncoated, having similar properties to those of steel may be used in addition or instead. Alternative materials from which the support member(s) 120 may be made include plastic, composite materials such as carbon composites, and the like.

Figure 12:
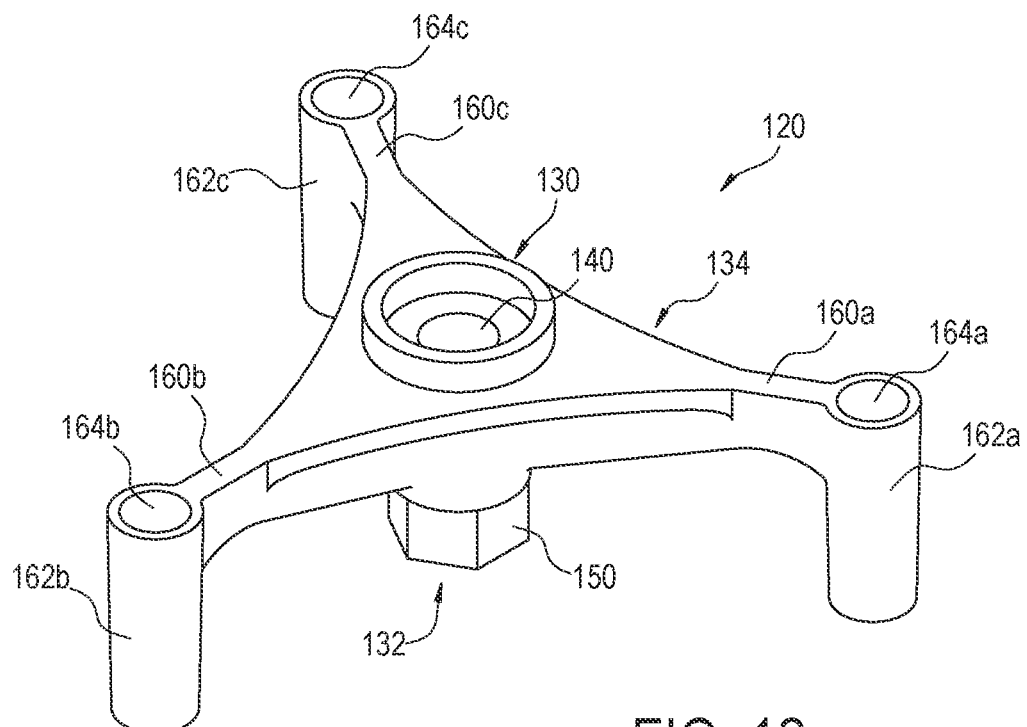
FIG. 12 is a perspective view of an example support member that may be used by the example first stud rail assembly.
Figure 13:
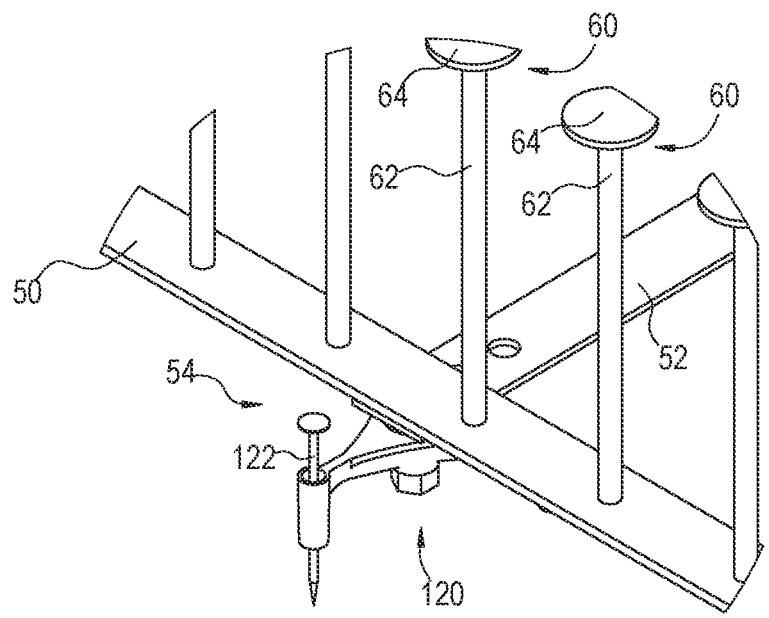
FIG. 13 is a perspective detail view of a portion of FIG. 7 illustrating the example support assembly of the example first stud rail assembly.

The example support assembly(ies) 54 may comprises a support member 120 and a fastener 122 as shown in FIGS. 12 and 13. The support members 120 forming the example plurality of support assemblies 54 are all the same but may be different. The example support members 120 each comprises a central portion 130, a connecting portion 132, and at least one engaging portion 134.

The example central portion 130 defines a connecting opening 140 defining a connecting axis C. At least a portion of the connecting opening 140 is threaded (not shown). The central portion 130 may be formed in many different sizes and configurations. The example central portion 130 is cylinder. The example connecting portion 132 is in the form of a nut structure 150 that is coaxially aligned with the connecting axis C. The example nut structure 150 may be integrally formed with or secured to the central portion 130. The engaging portion 134 comprises at least one leg portion 160 extending from the central portion 130 radially outwardly from the connecting axis C. Each leg portion 160 defines at least one foot portion 162, and each foot portion 162 defines at least one fastener opening 164. The example engaging portion 134 comprises first, second, and third leg portions 160a, 160b, and 160c radially extending at equally spaced angles about the connecting axis C.

The example fastener(s) 122 is or may be a nail, screw, or the like that may be extended partly through the fastener opening(s) 164 and into the form 24. The fastener(s) 122 are used to secure the first example stud rail system 20 in a desired position and configuration relative to the first column portion 22 and the form 24 before and during the pouring of concrete to form the slab 36 and/or second column portion 38.

Figure 9:
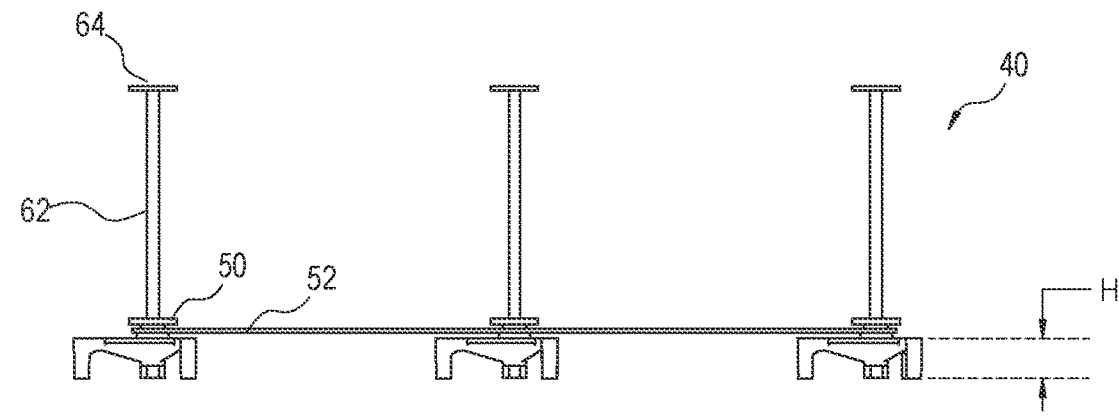
FIG. 9 is a side elevation view of the example first stud rail assembly, the example first stud rail assembly being depicted in an expanded configuration.

As perhaps best shown in FIG. 9, the example support member(s) 120 define a height dimension H. When the support member(s) 120 are secured to the support projection(s) 70 to secure the plurality of cross portion(s) 52 to the plurality of rail portion(s) 50, the height dimension H determines a spacing between the form upper surface 28 and a bottom of the stud rail assemblies 40. This spacing, and thus the height dimension H of the support members 120, is predetermined based on the structural requirements of the completed reinforced concrete structure 30.

When embedded within the slab 36, the support member(s) 120 are configured to inhibit or prevent water reaching the stud rail system 20. The example support member(s) 120 are thus preferably made of or coated with a material that inhibits oxidation of the support member(s) 120. A typical material from which the support member(s) 120 is made is plastic, but other materials, coated or uncoated, having similar properties as plastic may be used in addition or instead. In an example embodiment, the support member(s) 120 are plastic so the support member(s) 120 won't corrode and prevent water from getting up into the metal stud rail system 20. Similarly, when fully inserted into the fastener opening(s) 164, the fastener(s) 122 are spaced from the example stud rail system 20 such that water is inhibited or prevented from reaching any components of the example stud rail system 20 that are susceptible to oxidation.

To attach the support member(s) 120 to the example plurality of stud rail assembly(ies) 40, to the support projection(s) 70 is(are) inserted at least partly into the connecting opening(s) 140 such that the threaded external surface(s) 72 of the support projection(s) 70 engage the threaded internal surface portions of the connecting openings 140. The threaded internal surface portions may be formed by the nut structure in the form of a metal nut secured to the support member 120.

Rotation of the support member(s) 120 causes the threaded surfaces to engage each other such that the support member(s) 120 is secured relative to the support projection(s) 70. The nut structure 150 may be engaged to facilitate tightening of the support member(s) 120 onto the support projection(s) 70. Fastening system other than complementary threaded surfaces may be used to secure the support member(s) 120 to the support projection(s) 70.

What is claimed is:

1. A stud rail system for a reinforced concrete structure defining a column portion and a slab portion, the stud rail system comprising:
    at least one stud rail assembly comprising
        a plurality of rail portions,
        a plurality of cross portions,
        a plurality of pin projections, where each rail portion supports at least one pin projection,
        a plurality of support assemblies,
        a plurality of support projections extending from at least one of
            the plurality of the rail portions, and
            the plurality of the cross portions, and
        a plurality of support openings formed in at least one of
            the plurality of the rail portions, and
            the plurality of the cross portions; wherein
    each of the support projections extends through one of the support openings such that the plurality of rail portions are rotatably connected to the plurality of cross portions at a plurality of axis points to allow the stud rail assembly to be reconfigured between a collapsed configuration and an expanded configuration;
    before and during pouring of concrete to form the slab portion, the plurality of support assemblies is arranged to support the at least one stud rail assembly at a desired location and orientation relative to the column portion; and
    when supported at the desired location and orientation during pouring of the concrete slab portion, the at least one stud rail assembly is arranged within the slab portion such that at least the cross members, the pin projections, the support projections, and the support openings of each stud assembly are outside an area above the column portion.

2. The stud rail system of claim 1, wherein each pin projection comprises a rod portion and a cap portion.

3. The stud rail system of claim 2, wherein the rod portion defines a first diameter and the cap portion defines a second diameter.

4. The stud rail system of claim 3, wherein the second diameter is greater than the first diameter.

5. The stud rail system of claim 1, in which the plurality of support projections extend from each rail portion, where each support projection engages one support assembly.

6. The stud rail system of claim 5, in which each support assembly comprises a support member and at least one fastener, where each support member defines a nut structure configured to engage one of the plurality of support projections.

7. The stud rail system of claim 1, in which:
    the plurality of support projections extend from each of the plurality of rail portions; and
    the plurality of support openings are formed in each of the plurality of cross portions; wherein
    each support projection extends through one support opening and engages one support assembly.

8. The stud rail system of claim 7, wherein arrangement of the at least two support projections through the at least two support openings allows movement of the plurality of rail portions relative to the plurality of cross portions such that the stud rail assembly may, before pouring of concrete to form the slab portion, be reconfigured between the expanded configuration and the collapsed configuration.

9. The stud rail system of claim 1, wherein each support assembly comprises a support member and at least one fastener.

10. The stud rail system of claim 9, wherein the at least one fastener is configured to support the stud rail system in the desired orientation relative to the column portion before and during pouring of concrete to form the slab portion.

11. The stud rail system of claim 9, wherein each support member is configured to prevent water from reaching the stud rail system after pouring of concrete to form the slab portion.

12. A method of reinforcing a concrete structure comprising a column portion and a slab portion, the method comprising the steps of:
    providing a form;
    providing a plurality of rail portions;
    providing a plurality of cross portions;
    supporting a plurality of pin projections on each of the plurality of rail portions;
    arranging a plurality of support projections to extend from at least one of
        the plurality of the rail portions, and
        the plurality of the cross portions, and
    forming a plurality of support openings in at least one of
        the plurality of the rail portions, and
        the plurality of the cross portions
    providing a plurality of support assemblies;
    forming at least one stud rail assembly by
    arranging each of the plurality of support projections within one of the plurality of support openings such that the plurality of rail portions are rotatably connected to the plurality of cross portions at a plurality of axis points to allow the stud rail assembly to be reconfigured between a collapsed configuration and an expanded configuration;
    before and during pouring of concrete to form the slab portion, arranging each of the support assemblies to support the at least one stud rail assembly at a desired location and orientation relative to the column portion; and
    arranging concrete on the form around the stud rail system in the desired location and orientation to form the slab portion such that at least the cross members, the pin projections, the support projections, and the support openings of each stud assembly are outside an area above the column portion.

13. The method of claim 12, further comprising the step of supporting the form such that a form upper surface defined by the form is in a desired location and orientation relative to the column portion.

14. The method of claim 12, further comprising the step of arranging the stud rail system at least partly above at least one of the form and the column portion.

15. The method of claim 12, in which the step of forming the stud rail system comprises the step of reconfiguring each stud rail assembly from the collapsed configuration to the expanded configuration.

16. The method of claim 12, further comprising the step of arranging at least one fastener to fix a location of at least one of the support assemblies relative to the form.

17. The method of claim 12, in which:
the step of providing the plurality of support assemblies comprises the steps of
  providing a plurality of support members each comprising a nut structure;
  providing a plurality of fasteners; and
the step of forming the stud rail system comprises the steps of
  engaging each nut structure with one of the support projections, and
  arranging each of the plurality of fasteners to secure one of the support members relative to the form.

18. A reinforced concrete structure comprising:
a column portion;
a slab portion;
a stud system comprising a plurality of stud rail assemblies, where each of the plurality of stud rail assemblies comprises:
  a plurality of rail portions,
  a plurality of cross portions,
  a plurality of pin projections each supported by one of the plurality of rail portions, and
  a plurality of support assemblies, where each of the support assemblies engages one of the plurality of rail portions such that the plurality of rail portions are rotatably connected to the plurality of cross portions to allow the stud rail assembly to be reconfigured between a collapsed configuration and an expanded configuration
  a plurality of support projections extending from at least one of
    the plurality of the rail portions, and
    the plurality of the cross portions, and
  a plurality of support openings formed in at least one of
    the plurality of the rail portions, and
    the plurality of the cross portions; wherein
  each of the support projections extends through one of the support openings such that the plurality of rail portions are rotatably connected to the plurality of cross portions at a plurality of axis points to allow the stud rail assembly to be reconfigured between a collapsed configuration and an expanded configuration;
  before and during pouring of concrete to form the slab portion, the plurality of support assemblies is arranged to support the plurality of stud rail assemblies at desired locations and orientations relative to the column portion; and
  when supported at the desired locations and orientations during pouring of the concrete slab portion, the plurality of stud rail assemblies is arranged within the slab portion such that at least the cross members, the pin projections, the support projections, and the support openings of each stud assembly are outside an area above the column portion.

19. The reinforced concrete structure of claim 18, in which:
the plurality of support projections extend from each of the plurality of rail portions; and
the plurality of support openings are formed in each of the plurality of cross portions; wherein
each support projection extends through one support opening and engages one support assembly.

20. The reinforced concrete structure of claim 18, in which:
each support assembly comprises a support member and at least one fastener;
each support member defines a nut structure; and
each nut structure is configured to engage one of the plurality of support projections.

* * * * *